May 28, 1968  S. J. EVERETT  3,385,296
COLLAPSABLE BAG LINERS FOR HYPODERMIC SYRINGES
Filed June 4, 1963  2 Sheets-Sheet 1
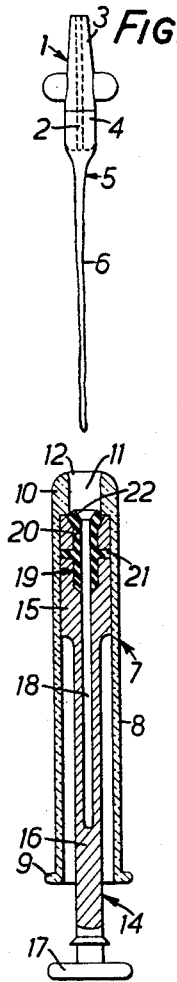
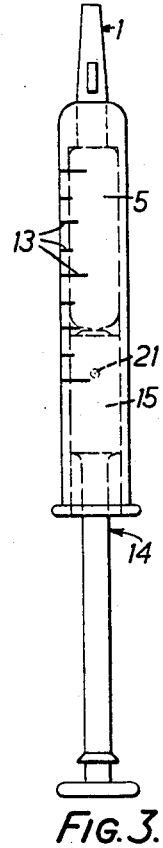
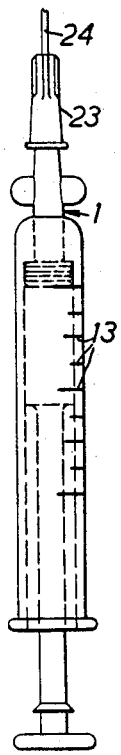
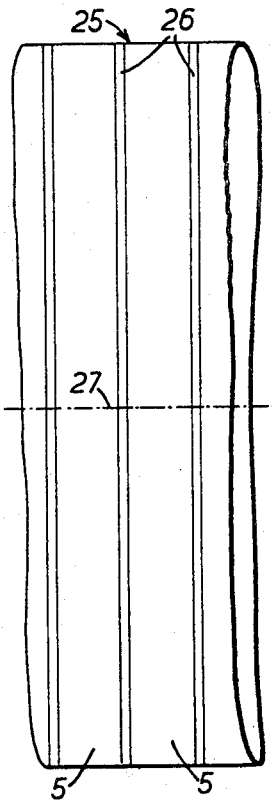
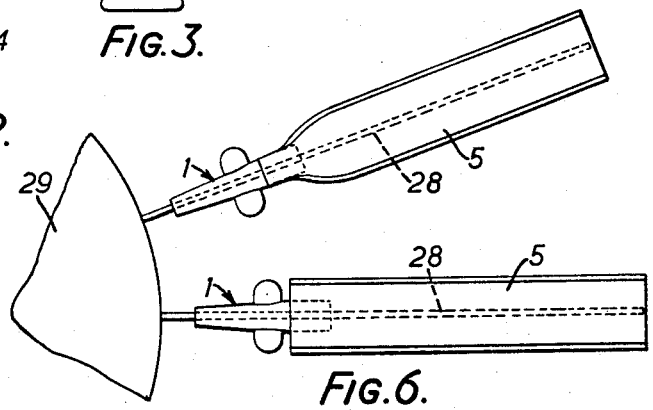
INVENTOR
SAMUEL JAMES EVERETT
BY Hume and Nydick
ATTORNEYS May 28, 1968  S. J. EVERETT  3,385,296
COLLAPSABLE BAG LINERS FOR HYPODERMIC SYRINGES
Filed June 4, 1963  2 Sheets-Sheet 2
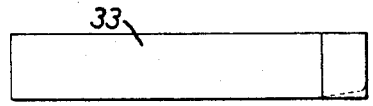
FIG. 7.
FIG. 8.
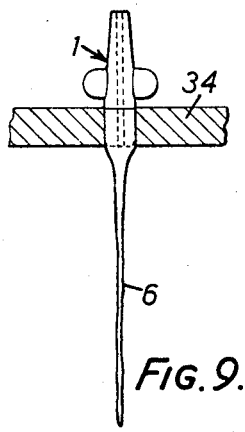
FIG. 9.
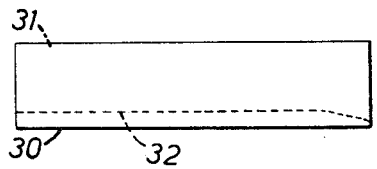
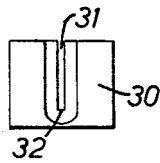
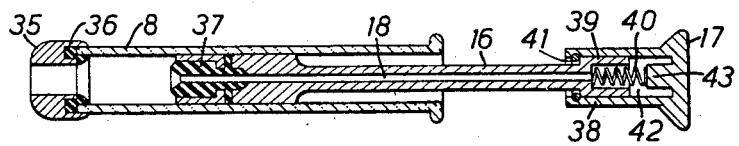
FIG. 10.
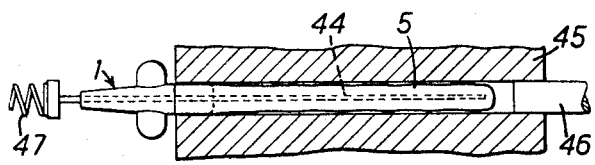
FIG. 11.
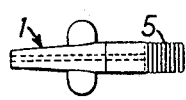
FIG. 12.
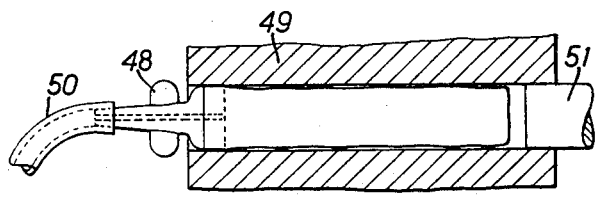
FIG. 13.
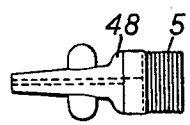
FIG. 14.
INVENTOR
SAMUEL JAMES EVERETT
By Haure and Nydick
ATTORNEYS

United States Patent Office 3,385,296
Patented May 28, 1968

3,385,296
COLLAPSIBLE BAG LINERS FOR HYPODERMIC SYRINGES
Samuel James Everett, London England, assignor to Lapis Engineering Company Limited, a British company
Filed June 4, 1963, Ser. No. 285,485
Claims priority, application Great Britain, June 5, 1962, 21,644/62; Sept. 11, 1962, 34,659/62; Nov. 14, 1962, 43,053/62; Mar. 6, 1963, 8,913/63; May 7, 1963, 17,946/63
9 Claims. (Cl. 128—218)

This invention relates to hypodermic syringes and is concerned with constructions in which the fluid contents of the syringe (which may be a medicament for injection, or body fluid withdrawn) are contained within a collapsible bag, removably secured within the barrel of the syringe. The provision of such a bag, which constitutes a renewable and disposable lining to the syringe, greatly reduces, or even eliminates completely, the necessity for sterilization of the syringe itself and the risk of cross infection owing to imperfect sterilization.

The invention comprises a renewable liner for a hypodermic syringe constituted by a bag, formed of thin synthetic resin plastic sheet material, having a needle mounting hub sealed into its mouth, the bag being collapsed into contracted form and the plastic sheet material set in this condition. With such a liner, the operation of loading a lining bag into the syringe is greatly facilitated. The bag, set in its contracted form, is very easily introduced into the barrel of the syringe through an opening provided at the front end of the barrel, the hub member of the liner fitting tightly into this opening to secure the liner in position and seal the syringe. The syringe with which the liners are used is so constructed as to allow a lining bag to be inserted in this way while the piston of the syringe is in its fully forward position, expansion of the lining bag to fill the interior of the syringe barrel being effected by withdrawing the piston rearwardly. The invention also comprises syringes adapted for use with the liners of the invention.

A number of specific embodiments of the invention are further described below by way of illustrative example, reference being made to the accompanying drawings, in which:

FIGURE 1 is a side view of a liner in accordance with the invention;

FIGURE 2 is sectional side view of a syringe for use with the liner of FIGURE 1;

FIGURE 3 is a side view of the syringe of FIGURE 2, after insertion of the liner of FIGURE 1 with the lining bag partly expanded;

FIGURE 4 is a side view of the same syringe at a later stage of operation and with an injection needle fitted;

FIGURE 5 shows a small section of plastic tubing from which the liner bags are made;

FIGURE 6 is a fragmentary plan view of apparatus used in the making of the liners, showing two stages in their production;

FIGURE 7 is a side view and FIGURE 8 an end view of a die press used in the production of the liners;

FIGURE 9 shows a further stage in the production of the liners;

FIGURE 10 is a sectional side view of a modified form of syringe;

FIGURE 11 shows a stage in the production of a modified form of liner, FIGURE 12 showing the liner produced; and FIGURE 13 shows a stage in the production of another modified form of liner, FIGURE 14 showing the liner produced.

The liner shown in FIGURE 1 of the drawings comprises a needle-mounting hub 1, moulded from synthetic resin plastic material with a longitudinally extending bore 2. The forward end portion 3 of the hub is tapered externally to fit within the socket member of a hypodermic needle of standard pattern, the portion 3 of the hub being similar in shape to and serving the same purpose as the nozzle of a syringe of usual construction. The rear end portion 4 of the hub is sealed into the mouth of a bag 5, made from thin walled pliable polyethylene tubing in a manner to be described below. The main portion of the bag, projecting rearwardly from the hub is contracted into the form of a thin elongated rod 6, aligned with the hub and having a substantial degree of stiffness and rigidity. Intermediate its ends, the hub is formed with a pair of oppositely projecting wings which afford a good finger grip and facilitate manipulation.

The syringe shown in FIGURE 2 has a body 7 of integral construction, formed wholly from glass. The body comprises a tubular barrel 8, open at its rear end, where an outwardly projecting flange 9 is provided, to afford a finger hold. The forward end of the barrel is closed by a wall 10 formed with an axial bore 11 of circular cross section, the bore being parallel sided except that its extreme forward end 12 is outwardly flared, or bell mouthed. The wall of the barrel is marked with a graduated scale 13 (see FIGURES 3 and 4) indicating capacity, the zero of this scale being positioned some little distance rearwardly from the front wall of the barrel.

The plunger 14 of the syringe comprises a cylindrical metal piston 15, accurately machined to fit the bore of the barrel. Accurate manufacture and the use of the sliding surfaces of piston and barrel of a silicone oil or other lubricant such as glycerine (which does not affect the material of the bag or the rubber bung mentioned below) allows an airtight fit to be obtained without the provisions of washers or sealing rings. The piston is secured to, or formed integrally with, a piston rod 16 of reduced diameter, which extends rearwardly out of the barrel and carries a finger knob 17 at its rear end. The plunger is formed with an axial bore 18, extending rearwardly from the front face of the piston. The front part of the bore in the piston is increased in diameter and its forward end is flared to form a conical surface of 60° included angle. This enlarged portion of the bore is intersected by a cross bore of small diameter. A bung 19 formed of very soft elastomeric material, such as silicone rubber, is accommodated in the bores of the piston, being suitably formed by moulding in situ. The bung comprises a tubular portion 20 which occupies the enlarged forward end of the longitudinal bore and laterally projecting pins 21 which fill the cross bore and anchor the bung firmly in position. The front face of the bung is shaped to provide an annular peripheral ridge 22, which projects beyond the front face of the piston. The inner face of this ridge is inclined conically rearward, forming a flared entry to the bore of the tubular portion 20, which forms a smooth continuation of the narrow rear portion of the axial bore 18 in the plunger.

To lead a liner into the syringe, the plunger is moved fully forward, as shown in FIGURE 2. It will be seen that the parts are so shaped that the front face of the piston can be brought directly against the rear face of the front wall of the barrel, the forward end of the piston passing the zero graduation mark. A liner, as shown in FIGURE 1, is then dropped through the bore 11 in the front wall of the syringe barrel, the stiffened rod-like form of the bag 6, in conjunction with the flared entry provided by the bung 19 making it easy to introduce the bag into the axial bore 18 in the plunger. The parallel sided rear portion 4 of the hub member of the liner is pressed fully home into the bore 11 to secure the liner in position and make an airtight fit.

The plunger 14 is then withdrawn rearwardly, the bag being expanded progressively along its length, as it is withdrawn from the bore of the plunger, by air or other fluid drawn into the bag through the bore of the hub, FIGURE 3 showing the parts during the course of this movement. The bag having been fully expanded, the piston is again moved forwardly, collapsing the bag longitudinally against the front wall of the barrel. Any risk of damage to the bag is minimized by the rubber bung in the mouth of the bore of the plunger. Pressure exerted by the fluid-filled bag against this bung tends to press the bung further into the conical mouth of the bore in the piston, thereby contracting the bung and closing the bore through it. When the bag is fully collapsed, as shown in FIGURE 4, it occupies the space between the front wall of the barrel and the zero graduation, the front end of the piston being then opposite this graduation.

At this stage, or at an earlier stage if desired, the socket member 23 of a hypodermic needle 24 is fitted onto the tapered front end 3 of the hub member of the liner, the canula of the needle communicating through the bore 2 of the hub with the interior of the bag 5. The syringe may then be operated one or more times in the usual way.

Liners of the form shown in FIGURE 1 may be produced by the method described below with reference to FIGURES 5 to 9 of the drawings. The bag 5 of the liner is formed from thin-walled, pliable polythene tubing, this material having the property of shrinking in the longitudinal direction when heated. The bags are formed in such a way that the length of each bag extends transversely of the original tubing, so that the shrinkage produced by heating will reduce the width rather than the length of the bag. For example, bags of 2 ml. capacity may be formed from lay flat tubing 6 inches wide, a short section of which is shown at 25 in FIGURE 5. The walls of the tubing are welded together along transverse lines 26 set at ½ inch centres and the tubing is dissected along the centre lines of these welds and along the centre line 27 of the tubing. This operation yields flat, rectangular bags, each 3 inches long and ½ inch wide, welded along both side edges and with one closed end formed by the fold of the original tubing.

The mouth of each bag 5 is then fitted with a hub member 1 of moulded synthetic plastic material, of the form already described. To assemble the bag to the hub, the hub 1 is threaded over a wire or rod 28 and the bag is then drawn over the projecting end of this rod until its mouth portion engages round the rear end portion 4 of the hub, as shown on the left hand side of FIGURE 6. The mouth portion of the bag is then heated sufficiently to shrink it into close engagement with the hub and seal it thereto, as shown on the right hand side of FIGURE 6. Such heating may be effected by holding the bag horizontal and subjecting the mouth end to the action of flames. Conveniently as shown in FIGURE 6, a turntable, or other common support 29, carries a plurality of horizontally projecting rods 28, each of which is fitted with a hub member and a bag, movement of the support carrying the mouth end of each bag in turn through a heating zone. The heating zone may comprise a flame, or set of flames, which shrinks the mouth of the bag onto the hub without fusing the material of the bag, and a second flame, or set of flames which effects the sealing of the bag to the hub.

The bag with the hub member attached is then removed from the rod 28 and collapsed to contracted form by use of the appliance shown in FIGURES 7 and 8. This appliance comprises a die block 30 of aluminium or other suitable material, formed with a slot 31 having a width of some ⅟₁₆″, a depth slightly greater than the width of the bag, and an effective length substantially equal to that of the flat portion of the bag. The mouth portion of the bag and the hub member on which it is secured project to one side of the block from the open end of the slot, which is correspondingly flared to accommodate them, as indicated at 32. Conveniently, a single block is formed with a plurality of transverse slots of the required width and depth, each slot serving to accommodate two bags, disposed with their closed ends close together near the centre line of the block and their hub members projecting to opposite sides of the block. The part of the bag lying within the slot is then collapsed or contracted by introducing into the upper end of the slot a closely fitting tongue or plunger 33, formed of or edged with silicon rubber and pressing it downwardly towards the bottom of the slot, so that the bag becomes folded back and forth along a number of longitudinal lines. The tongues or plungers required to act upon a plurality of bags may be mounted upon a common member, whose downward movement will simultaneously collapse all the bags.

When the bag is loaded into the die slot, the die block is at a temperature not exceeding about 50° C., but after the bag has been collapsed, the block is heated for a short time to a temperature of about 75° C. to 80° C. and is then allowed to cool back to about 50° C. The plunger is then raised and the bag removed, the block being immediately ready for the reception of a fresh bag. The heat treatment to which the bag has been subjected has the effect of setting it in the collapsed rodlike condition into which it was brought by the action of the plunger. The above mentioned thin polythene bags of 2 ml. capacity can thus be contracted into rods which will freely enter a hole of ³⁄₃₂ inch diameter. Bags of 20 ml. capacity can be contracted into rods which will freely enter a hole ⅛ inch in diameter.

The rear portion 4 of the hub is initially made slightly too large in diameter to fit within the bore 11 in the front wall of the syringe. In a final shaping operation this portion 4 of the hub (with the mouth portion of the bag which covers and is sealed to it) is brought to the exact size required to make a close fit in bore 11. As illustrated in FIGURE 9, a die plate 34 is formed with a hole of the desired diameter, which is parallel sided except for a flared entry end. The rod-like bag is passed through this hole and the rear portion 4 of the hub is forced into it, thus compressing the material of the hub. The die plate is heated to set the hub in this condition, leaving it exactly the right size to enter quite easily the bore 11 of the syringe but make an air tight fit therein.

FIGURE 10 shows a syringe embodying a number of modifications which may be applied separately or together to the syringe of FIGURES 2 to 4.

Instead of being formed integrally with the glass barrel 8, the front wall of the syringe body is constituted by a metal cap 35, socketed to receive the front end of the barrel and cement it to it. To avoid any risk of damage to the lining bag, the rear face of the metal front wall is covered by a washer 36, of silicon rubber, clamped between the barrel and the cap.

The rubber bung 37 in the plunger has at its forward end a head portion which is cylindrical rather than conical in form, the rear face of the head being flat and seating against a plane annular shoulder in the bore of the piston. It has been found that provided the material of the bung is sufficiently soft, it is unnecessary to provide a conical surface on the piston in order to ensure that the mouth of the bore in the bung will be closed to prevent entry of the bag when the piston is moved forwardly to compress a previously expanded bag.

With a syringe and liner constructed and used as already illustrated and described, only a very small volume of air is trapped inside the syringe barrel outside the walls of the bag and there is little tendency for this air to be compressed by the operation of forcing the hub firmly into position. However it will be appreciated that the existence of such a positive pressure within the syringe would tend to crumple the walls of the bag away from the walls of the syringe barrel during operation of the syringe and could thus lead to incorrect dosage. To guard against this possibility and secure other advantages, the syringe of FIGURE 10 is provided with an air pump comprising an expansible chamber in communication with the interior of the barrel forwardly of the piston. During insertion of a bag, the chamber is held contracted and when the bag is firmly in position, the chamber is expanded, thus producing a slight negative pressure within the syringe barrel. In the construction illustrated, the thumb button 17 at the rear end of the syringe plunger is formed as part of a cylindrical cap 38, fitting slidably over an enlarged cylindrical head 39 formed on the rear end of the piston rod 16. The cap 38 is urged rearwardly by a compression spring 40, accommodated within the head 39, but is retained to the plunger by a circlip 41. The bore 18 of the plunger is extended rearwardly and opens into the air chamber 42 formed between the cap 38 and the head 39. While a liner is being fitted into the syringe the cap 38 is held pressed in to reduce the trapped air space to a minimum, a projection 43 on the cap occupying the greater part of the interior of the head 39. When the bag has been securely fitted, the cap is released and is urged rearwardly by spring 40, but it should not then return fully to its rearmost position, the position assumed by the cap affording an indication of the negative pressure created within the syringe barrel. Outward movement of the cap to its extreme position while a bag is in position in the syringe indicates that the negative pressure has been lost and a check is thus afforded against insufficiently tight fitting of the bag hub in the syringe and against leakage of the bag.

While the use of a bag contracted into the rod-like form described above has many advantages, such a form can be used only if the bag is made from very flexible material, such as thin polyethylene sheet. A bag made from more rigid material, such as polypropylene, and contracted into rod-like form will not always open out in a satisfactory manner when the piston of the syringe is retracted. As an alternative, therefore, the bag may be collapsed longitudinally into the form of a plug or button. The bag thus contracted may have a diameter which is considerably greater than that of the rod-like forms already described and illustrated and may be only slightly less than that of the syringe barrel. FIGURES 12 and 13 show two forms of renewable liner incorporating such longitudinally contracted, button-like bags.

The liner shown in FIGURE 12 is produced precisely in the manner described above with reference to FIGURES 5 to 9, except that it is not treated in the appliance of FIGURES 7 and 8. Instead, a rod-like mandrel 44 is inserted through the bore of the hub to the closed end of the bag, as shown in FIGURE 11; the bag is crumpled laterally onto the mandrel and (with the mandrel in position within it) is inserted into a bore formed in a die block 45, until the rear portion 4 of the hub 1 engages in the entry end of the bore. A plunger 46 working in the bore is then advanced to contract the bag longitudinally against the rear end of the hub. As contraction proceeds, the mandrel is pushed out of the bag against the action of a weak spring 47, the mandrel serving to ensure correct and progressive crumpling of the bag. While in this collapsed condition, the bag is heat treated at about 80° C. to set the material of the bag in its collapsed state. Before or after compressing the bag, a suitable lubricant may be applied to its outer surface, to ensure correct operation when the bag is eventually used in a syringe.

The liner shown in FIGURE 14 includes a modified hub member 48 having a rear portion of enlarged diameter. After the mouth of the bag has been heat sealed to the hub, the bag is inserted into the bore of a die block 49 (FIGURE 13) the diameter of this bore being only slightly less than that of the syringe barrel. A hose 50 supplying low pressure air is coupled to the front end of the hub member, the air expanding the bag into contact with the walls of the bore. A plunger 51 working in the bore is then advanced to contract the bag longitudinally against the rear face of the hub, the air pressure within the bag ensuring regular and progressive crumpling of the bag. The bag is then set in this contracted condition by heat treatment.

The liner of FIGURE 12 may be used with a syringe of substantially the same construction as those used with the liners having rod-like bags, with the difference that no bore for the reception of the bag is provided in the syringe plunger.

The syringe used with the liner of FIGURE 14 necessarily has its front end wall formed with an opening of increased diameter to admit the bag and the rear end of the hub. To ensure a tight fit and secure engagement between the hub and the syringe, the bore of the front end wall of the syringe may be formed with a shallow screw thread. A suitable form of thread is one having about sixteen turns per inch, sharp angles at the crest and trough of the threads, while the faces of the threads are inclined at an angle of only some 5° to the axis, so that the included angles at crest and trough are about 170°. It is not necessary to form the hub itself with a co-operating thread, the plastic material of the hub being deformed sufficiently to make a tight joint when the hub is pressed and turned into engagement with the bore in the front cap of the syringe.

When inserted into a syringe barrel, the button like bag of FIGURE 14 fills the syringe barrel over substantially its whole cross section and fits closely against the front end of the piston, so that very little air is trapped within the syringe barrel outside the walls of the bag. To obtain this result, the front face of the piston used to collapse the bag should be similar in shape to the front face of the syringe piston; both may be flat, coned or otherwise shaped.

With all the forms of renewable liner described above, a hypodermic needle may be secured directly in the hub member, to form one unit with the liner. In practice however it appears to be more convenient to make the needle as a separate unit, detachably fitted to the hub of the liner. Needles of a variety of different sizes and liner bags of a variety of different capacities may then be used in any desired combination without the necessity of maintaining in stock units of a very large number of different types. Also, the same liner may be used successively with two different needles, for example a large bore needle to allow easy charging of the bag and then a fine needle for injection purposes.

I claim:

1. A renewable liner for a hypodermic syringe constituted by a bag, formed of thin synthetic resin plastic sheet material, having a needle mounting hub sealed into its mouth, the bag being collapsed into contracted form and the plastic sheet material set in this condition.

2. A liner in accordance with claim 1 in which the bag is collapsed laterally into the form of an elongated rod, aligned with and projecting rearwardly from the needle mounting hub.

3. A liner in accordance with claim 1 in which the bag is collapsed longitudinally into the form of a plug or button adjacent the rear end of the needle mounting hub.

4. A method of making a liner for a hypodermic syringe comprising the steps of welding together superimposed layers of thermoplastic sheet material to form a flat elongated bag open at one end only, inserting a needle mounting hub into the mouth of the bag, heat sealing the bag to the hub, collapsing the bag into contracted form and heating the bag to set the material of the bag in its collapsed state.

5. The method in accordance with claim 4, in which the collapsing of the bag into contracted form is effected by inserting the flat bag into a narrow slot of a length sufficient to accommodate the bag and a depth greater than the width of the bag, pressing towards the bottom of the slot a plunger fitting closely therein to collapse the bag laterally, the setting of the material of the bag being effected by heating the block while the bag is held collapsed by the plunger.

6. The method in accordance with claim 4 in which the collapsing of the bag into contracted form is effected by inserting the bag into a die bore of a length sufficient to accommodate the bag and a diameter slightly less than that of the bag when fully distended, applying fluid pressure to the interior of the bag to expand it into contact with the walls of the die, and moving longitudinally of the die bore a plunger fitting closely therein to collapse the bag longitudinally, the setting of the material of the bag being effected by heating the die while the bag is held collapsed by the plunger.

7. A hypodermic syringe having a renewable liner constituted by a collapsible bag with a needle mounting hub sealed in a mouth of the bag, said syringe comprising a barrel having at its front end an opening in which the hub of the liner fits tightly, and a plunger reciprocable in the barrel and formed with an axial bore extending rearwardly from the front face of the plunger for receiving the bag in collapsed form.

8. A syringe in accordance with claim 7, in which the bore in the plunger includes an enlarged front portion which accommodates a tubular bung of soft resilient material, protecting the bag against damage during its collapse by forward movement of the plunger.

9. A syringe in accordance with claim 7 and comprising an expansible air chamber in communication with the interior of the barrel forward of the plunger, whereby the air pressure within the barrel can be reduced after the liner has been secured in position therein.

References Cited

UNITED STATES PATENTS

| 812,686 | 2/1906 | Schork et al. | 128—219 |
| 921,130 | 5/1909 | Lockwood | 128—218 |
| 3,093,133 | 6/1963 | Everett | 128—216 |

LOUIS G. MANCENE, *Primary Examiner.*

ROBERT E. MORGAN, *Examiner.*

S. NATTER, *Assistant Examiner.*